United States Patent [19]

Sweetland et al.

[11] Patent Number: 5,046,745
[45] Date of Patent: Sep. 10, 1991

[54] CONSTANT VOLUME PROTECTIVE BOOT

[75] Inventors: Roger D. Sweetland; Christopher L. Clarke; Michael J. Marthaler, all of Columbus, Ind.

[73] Assignee: Cummins Engine Company, Inc., Columbus, Ind.

[21] Appl. No.: 244,826

[22] Filed: Sep. 15, 1988

[51] Int. Cl.$^5$ .......................... F16J 3/04; F16J 15/52; H01F 7/08
[52] U.S. Cl. .............................. 277/212 FB; 74/18.2; 335/260
[58] Field of Search ...................... 277/212 F, 212 FB; 74/18, 18.2; 335/260; 251/41; 138/118, 119, 120

[56] References Cited

U.S. PATENT DOCUMENTS

| | | | |
|---|---|---|---|
| 1,788,919 | 1/1931 | Stevenson | 277/212 F |
| 1,978,916 | 10/1934 | Stolp et al. | 335/260 |
| 2,424,567 | 7/1947 | Hill | 277/212 F |
| 2,427,630 | 9/1947 | Snyder | 335/260 |
| 2,853,660 | 9/1958 | Immel | 335/260 |
| 2,858,487 | 10/1958 | Immel | 335/260 |
| 3,098,635 | 7/1963 | DeLaPorte et al. | 251/54 |
| 3,142,790 | 7/1964 | Baier et al. | 335/260 |
| 3,235,276 | 2/1966 | Leonard | 16/2 |
| 4,043,564 | 8/1977 | White | 277/212 FB |
| 4,114,460 | 9/1978 | Oto | 74/18.2 |
| 4,235,427 | 11/1980 | Bialobrzeski | 277/212 FB X |
| 4,407,517 | 10/1983 | Neyer | 277/212 FB |

FOREIGN PATENT DOCUMENTS 0003869 9/1979 European Pat. Off. ...... 277/212 FB

Primary Examiner—Allan N. Shoap
Attorney, Agent, or Firm—Sixbey, Friedman, Leedom & Ferguson

[57] ABSTRACT

A protective boot formed of a resilient elastomeric material is provided having a housing with an opening therein through which the reciprocating shaft of a solenoid or like device projects with the shaft being axially movable relative to the housing of the solenoid through a stroke of a predetermined length from an extended position to a retracted position. The protective boot includes a first ring portion sealingly fixed to the housing about the opening and, a second ring portion sealingly fixed to and reciprocatable with the shaft. The body portion of the boot forms a fluid chamber about the shaft between the first and second ring portions, with the body portion comprising at least one pair of truncated conical sections each being integrally formed at their narrow portion with a respective one of the ring portions and an intermediate portion integrally formed between the widened portions of the conical sections. The conical sections and the intermediate sections are provided with axial convolutions, ribs, or both for maintaining the conical sections and the intermediate portion axially rigid during movement of the shaft between the extended position and the retracted position. These convolutions or ribs also permit the conical sections and the intermediate portion to circumferentially expand and retract during movement of the shaft between its extended position and its retracted position to maintain an essentially constant volume within the fluid chamber.

15 Claims, 5 Drawing Sheets

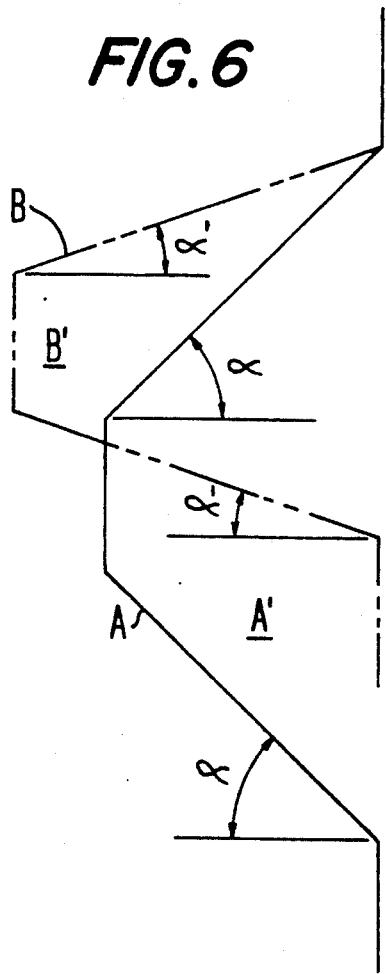

CONSTANT VOLUME PROTECTIVE BOOT

TECHNICAL FIELD

This invention relates to a protective boot in which axial movement causes a negligible change in volume and pressure within the boot.

BACKGROUND OF THE INVENTION

Solenoids used in many automobiles, trucks and other industrial machinery are subjected to adverse environmental conditions which would severely affect both the action of the solenoid and its operating life if such solenoids were left unprotected. This problem is present not only in motor vehicles and industrial machinery utilizing solenoids, but also in devices where intricate parts of movable members are subject to adverse environmental conditions.

A known arrangement for the protection of extensible members provides a corrugated sleeve or boot which has one open end sealed to the reciprocating shaft and a second open end sealed to the housing which receives and drives the shaft. This boot is permitted to act as an accordion, retracting and extending along with the reciprocating shaft. This arrangement however, is not adequate in protecting solenoids or other intricate parts in that the volume enclosed within the sleeve is constantly varying and subsequently so is the pressure being exerted on the solenoid. As the shaft, and consequently the sleeve, are retracted, the volume within the sleeve substantially decreases while the pressure within the sealed boot is necessarily substantially increased. This increase in pressure within the boot adversely affects the action of the solenoid and subsequently the movement of the shaft, while expending some of the fluid, be it air, oil or similar fluid, from the boot. Likewise, when the shaft is returned to its original extended position the volume is increased and the pressure decreased to a point where a vacuum occurs within the boot and due to such a vacuum, the movement of the shaft is restricted and contaminated air is drawn into the boot. While a protective boot of this type provides protection from direct exposure to the environment, the action of the solenoid may be affected due to the pressure changes, and some contaminants nevertheless will enter the boot, both of which may ultimately damage the solenoid or similar device within the boot.

One solution to the formation of excessively high pressures resulting in the subsequent existence of a vacuum was to provide the boot with one or a plurality of small holes which would allow the air or other fluid to readily escape and reenter the boot. However, is solution is impracticable where a contaminant free environment is critical to the operation and continued life of the device being protected.

Other arrangements have been developed for the protection of solenoids and similar devices including that set forth in U.S. Pat. No. 3,093,633 to Delaporte et al which discloses the use of a diaphragm for protecting a reciprocating shaft from adverse environmental affects. A diaphragm having one end sealed to the housing of the electromagnetic device and the other end sealed to the shaft is employed, and as the shaft reciprocates, the diaphragm turns inside out. From this construction, a pressure change must occur immediately before and after the diaphragm reverses it direction of curvature. Also, because the diaphragm is subjected to a complete 180° reversal of its position during each stroke, the diaphragm may become fatigued and fail prematurely.

U.S. Pat. No. 2,858,487 and 2,853,660 to Immel disclose the use of a dual diaphragm arrangement to protect a solenoid assembly. The two diaphragms are positioned on and sealed to opposite ends of the solenoid assembly with the concave portion of one diaphragm facing the convex portion of the other. Therefore, when the shaft reciprocates the movement of the first diaphragm is matched by that of the second thereby maintaining a constant volume within the housing. However, this type of arrangement may be utilized only in conjunction with those assemblies in which the reciprocating shaft is accessible from both sides of the assembly which in turn requires a special housing for its use.

Other attempts have been made to protect solenoids and similar assemblies having axially reciprocal shafts from adverse environmental effects such as providing gasket seals as shown in U.S. Pat. No. 1,978,916 to Stolp et al or by additional diaphragm arrangements as shown in U.S. Pat. No. 2,427,630 to Snyder and U.S. Pat. No. 3,142,790 to Baier et al. Each of these solutions encounter obstacles similar to that of the boot when applied to assemblies where only one end of the reciprocating shaft is accessible. These arrangements result in a substantial change in the volume within the housing and may result in the above-mentioned adverse affects.

Yet another attempt in providing a protective boot for solenoids is illustrated in U.S. Pat. No. 4,407,517 to Neyer. A protective boot of elastomeric material is sealed both to the housing and the reciprocatable shaft forming a fluid chamber. However, a boot of this type is limited in the length of stroke in which the shaft may travel and the active life of the boot is limited in that during each stroke of the reciprocating shaft, at least a portion of the boot will pivot 180° about a flexible joint which may, over time, fail, and require replacement. Also, the expansion of the boot during the retraction of the shaft requires that a portion of the boot extend beyond the sealing connection between the shaft and boot. The expansion of the boot may be greatly inhibited if the shaft to be reciprocated is of a greater diameter than the sealed connection, or if the shaft is of a short length and is attached to a larger body.

SUMMARY OF THE INVENTION

In view of the foregoing, it is an object of the present invention to provide a protective boot wherein axial movement of an extending shaft, to which a portion of the boot is sealed, causes a negligible change in the volume enclosed within the boot, as well as a negligible change in pressure within the boot.

A further object of the present invention is to provide a durable protective boot which will outlive the assembly which is being protected by the boot so as to remove the danger of having the protected assembly become contaminated due to the failure of the boot due to fatigue and the ingress of contaminated air. Thus, providing reliable protection for the assembly.

Yet another object of the present invention is to provide a protective boot wherein the variations in volume can be controlled in order to provide the negligible net change in volume within the boot during its use.

A further object of the present invention is to provide a protective boot which can be designed to be used in conjunction with shaft requiring large stroke lengths as well as those requiring short stroke lengths, and which will not be inhibited during its expansion.

These and other objects of the present invention are achieved by providing a protective boot formed of a resilient elastomeric material having a housing with an opening therein through which the reciprocating shaft of the solenoid projects with the shaft being axially movable relative to the housing of the solenoid through a stroke of a predetermined length from an extended position to a retracted position. The protective boot includes a first ring portion sealingly fixed to the housing about the opening and a second ring portion sealingly fixed to and reciprocatable with the shaft. The body portion of the boot forms a fluid chamber about the shaft between the first and second ring portions, with the body portion comprising at least one pair of truncated conical sections each being integrally formed at their narrow portion with a respective one of the ring portions and an intermediate portion integrally, formed between the widened portions of the conical sections. The conical sections and the intermediate sections are provided with axial convolutions, ribs, or both for maintaining the conical sections and the intermediate portion axially rigid during movement of the shaft between the extended position and the retracted position. These convolutions or ribs also permit the conical sections and the intermediate portion to circumferentially expand and retract during movement of the shaft between its extended position and its retracted position to maintain an essentially constant volume within the fluid chamber.

The above and other advantages of the invention will become apparent from the figures and the following description of the preferred embodiment.

BRIEF DESCRIPTION OF DRAWINGS

FIG. 6 is a schematic representation illustrating the expansion and contraction of the boot caused by the retraction and extension of a shaft being protected by the boot.

DESCRIPTION OF THE PREFERRED EMBODIMENT

FIGS. 1-5 illustrate a protective boot 2 for protecting a solenoid 3 or similar device having a reciprocating shaft 5. The protective boot 2 is provided for allowing free movement of the reciprocating shaft 5 and maintaining a contaminant free environment within the boot 2, while presenting a negligible change in volume and pressure within the boot during the reciprocation of the shaft.

Figure 1:
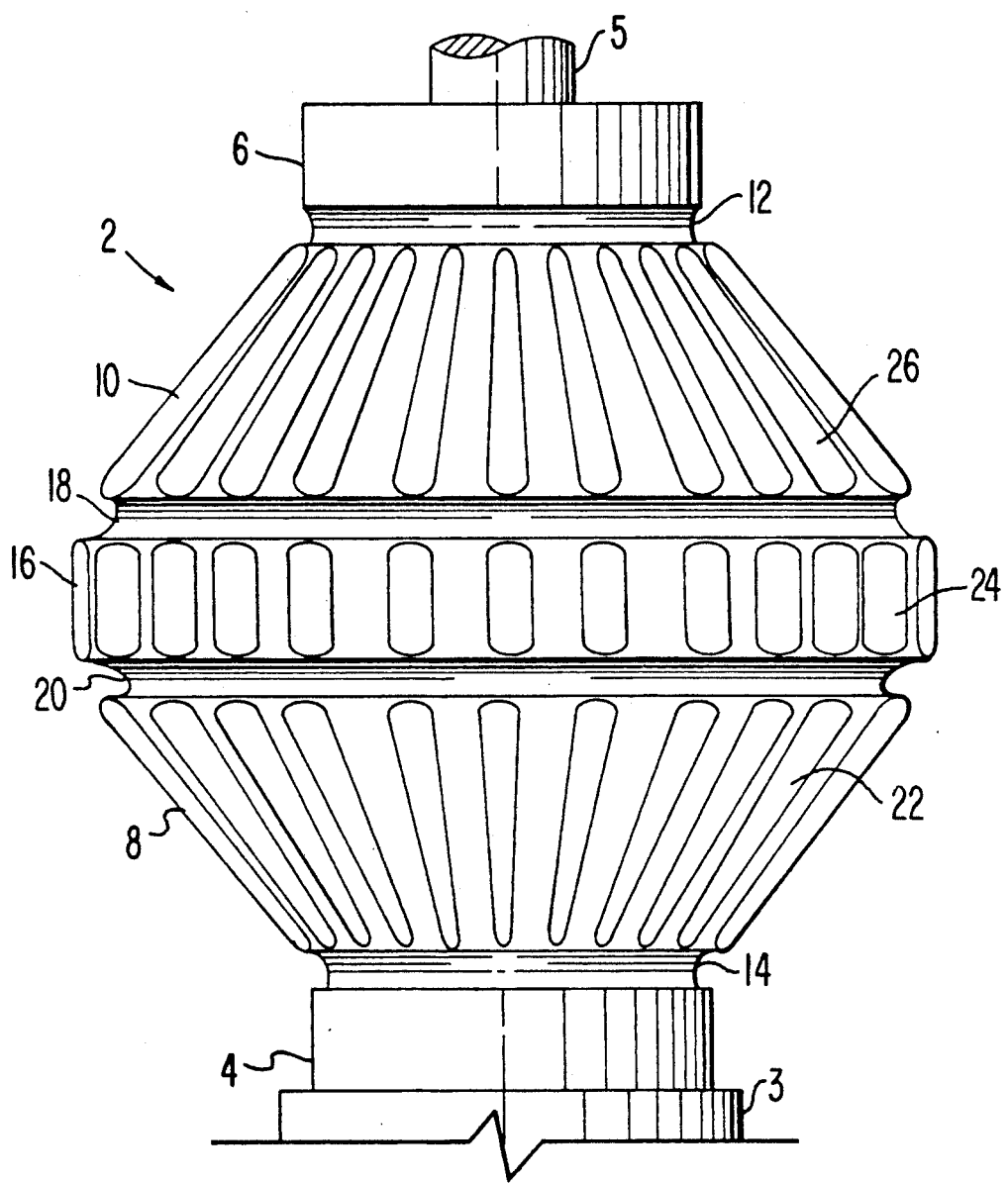
FIG. 1 is a side elevation view of a protective boot for a solenoid or similar device having a reciprocating shaft in accordance with a preferred embodiment of the invention.

As shown in FIG. 1, the boot 2 includes two stiff rings 4 and 6. One ring is sealingly attached to a solenoid 3 or like assemblies housing and the second ring is sealingly attached at a predetermined position on the reciprocating shaft 5. In doing so, one ring will remain in a fixed position while the second ring is moved toward and away from the first ring.

The boot 2 also includes a pair of truncated conical sections 8 and 10 which are integrally formed at their smaller opening with a respective ring by way of flexible hinges 12 and 14 respectively. The wide opening of the conical sections 8 and 10 are hingedly connected to one another by way of an intermediate ring 16 and flexible hinges 18 and 20.

Figure 2:
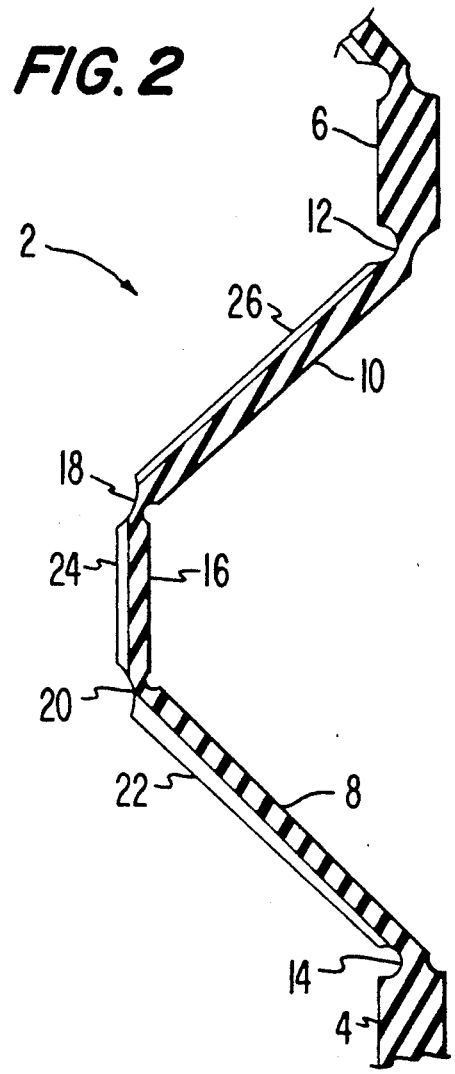
FIG. 2 is a partial longitudinal sectional view of FIG. 1 taken along line II—II.

As shown in FIG. 2, the protective boot 2 is of a continuous unitary structure formed of a resilient elastomeric material such as natural rubber or synthetic rubber. The flexible hinges 12, 14, 18 and 20 are formed as thin regions which allow the sections to pivot about these points relative to one another.

The truncated conical sections 8 and 10 and the intermediate ring 16 are provided with circumferentially spaced ribs 22, 24 and 26 respectively. These ribs maintain the boot axially rigid during movement of the shaft while at the same time allow these sections to radially expand. As is schematically illustrated in FIG. 6, the boot 2 is shown by the solid Figure A in the extended position, and by the broken Figure B in the retracted position. Due to the axial rigidity imparted by the ribs 22, 24 and 26, on the truncated conical sections 8 and 10 and the intermediate ring 16, and the pressure existing within the boot 2, during the retraction of the shaft from A to B, the boot will circumferentially expand such that the enclosed volume A' and B' are essentially identical. Therefore, the pressure change exerted on the solenoid or like assembly will be negligible. In doing so, the solenoid is housed in a constant contaminant free environment. Also, the expansion of the boot is in an outward direction and the boot 2 does not overlap or extend beyond the stiff rings 4 and 6 i.e., the constant volume is maintained between the axial limits of the constant volume boot as defined by the rings 4 and 6 of FIG. 1, and 4' and 6' of FIG. 4.

Figure 3:
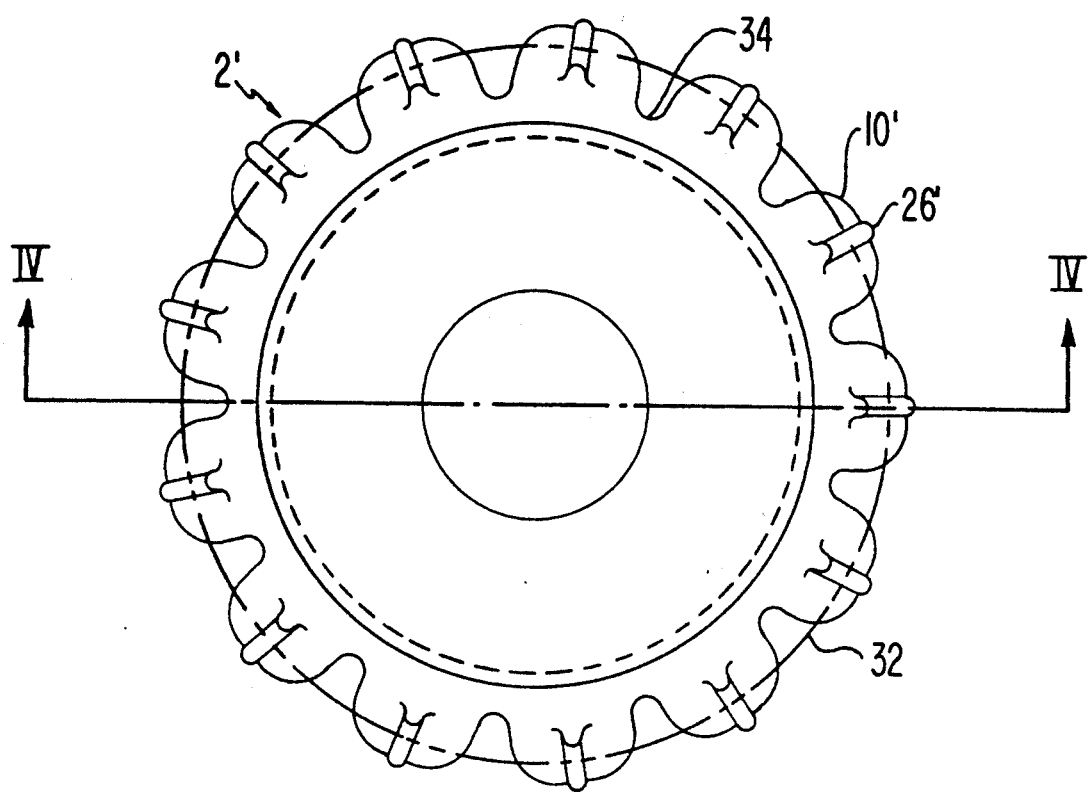
FIG. 3 is an end elevational view of an alternative embodiment in accordance with the present invention.
Figure 5:
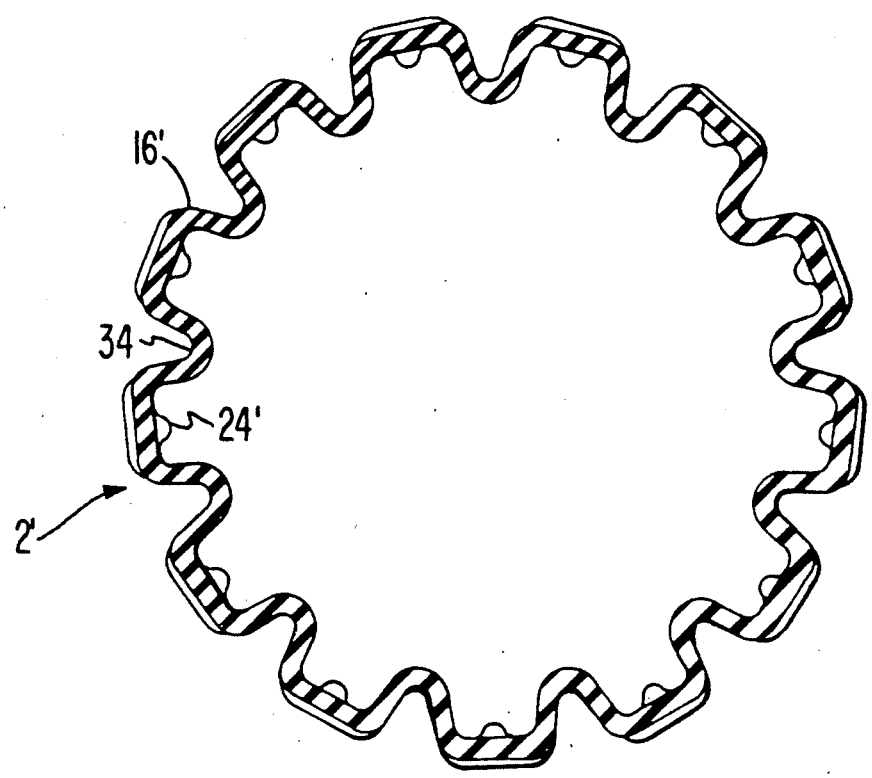
FIG. 5 is a radial cross sectional view of FIG. 4 taken along line V—V.
Figure 4:
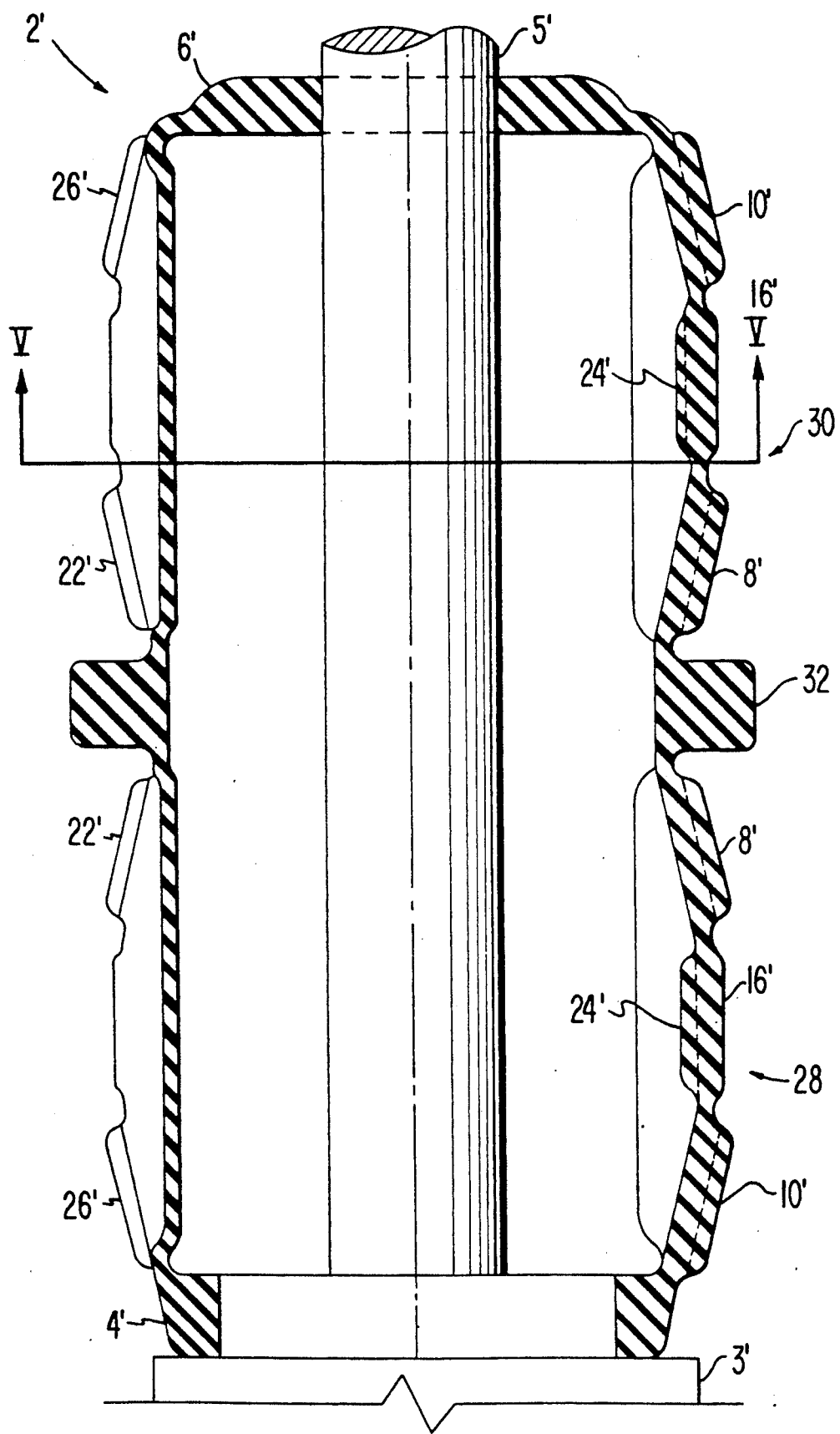
FIG. 4 is a sectional side elevation view of the boot of FIG. 3 taken along line IV—IV.

FIGS. 3-5 illustrate an alternative embodiment of the present invention. As shown in FIG. 4, the protective boot 2' may consist of a plurality of sections, therefore, the boot is capable of accommodating virtually an unlimited stroke length. As illustrated, the boot 2' consists of two sections 28 and 30. These sections are mediated by a large rigid ring 32 which is capable of sliding axially along the reciprocating shaft 5' but maintains its rigid circular configuration during the movement.

Each section 28 and 30 consists of a pair of truncated conical sections 8' and 10', and an intermediate ring 16'. The conical sections 8' are hingedly formed with the rigid ring 32 while the conical sections 10' are hingedly formed with rigid rings 4' and 6', one of which is sealingly secured to the solenoid housing 3' and the other to the reciprocating shaft 5'.

As is illustrated in FIGS. 3 and 5, the surface of the boot 2' is convoluted, forming troughs 34 about the circumference of the boot. The convoluted structure further adds to the overall axial rigidity of the boot while allowing circumferential expansion to occur. The peaks are provided with the axial ribs 22' and 26', and in the present embodiment, the ribs 24' are alternatively provided on the interior of the intermediate ring 16'. Again, as shown in FIG. 6, the volume enclosed within each section 28 and 30, will remain essentially constant, while the pivoting of the individual sections of the boot is minimized. This pivoting angle which may be represented by $\alpha$-$\alpha'$, is quite small in comparison with that of the prior art, and in so doing, the life of the protective boot is maximized because the fatigue at these joints is lessened substantially. (1 The boots 2 and 2' are of a simple, one piece construction, which may be manufactured by way of a number of methods, one of which may be injection molding. The boot, while in use will provide a contaminant free environment while maintaining generally constant volume and pressure within the boot. The magnitude of volume and changes in that volume may be readily controlled to provide the required negligible net change in volume by adopting the appropriate proportions of the rigid rings 4 and 6 and the intermediate ring 16, and providing the optimum working angle of the truncated cones 8 and 10 for the particular volume enclosed and the particular stroke required.

While the invention has been described with reference to preferred embodiments, it should be appreciated to those skilled in the art that the invention may be practiced otherwise than as specifically described herein without departing from the spirit and scope of the invention. It is, therefore, to be understood that the spirit and scope of the invention be limited only by the appended claims.

INDUSTRIAL APPLICABILITY

The protective boot of the present invention may be applied in any mechanical device where it is critical to protect the drive assembly of a reciprocating shaft retained within a housing from adverse environmental effects. Such drive assemblies are commonly found in trucks and automobiles, however, often other industrial equipment will require such protection where the performance of the drive assembly may be affected by changes in pressure within the boot or damaged by the environment.

We claim:

1. A protective boot having a body formed of a resilient elastomeric material, said body forming a fluid chamber and comprising: first and second ring portions forming openings in said body, at least a first and a second truncated conical section each being hingedly connected at their narrow portion with a respective one of said ring portions by resilient hinge section, an intermediate portion hingedly connected between widened portions of said truncated conical sections by third and fourth resilient hinge section, and means for maintaining a constant volume within said protective boot, said means comprising stabilizing means for maintaining said conical sections and said intermediate portion axially rigid and for permitting said body to be circumferentially expansible and contractible.

2. A protective boot as defined in claim 1, wherein said stabilizing means is a plurality of circumferentially spaced axially extending ribs formed on said conical sections and said intermediate portion.

3. A protective boot as defined in claim 1, wherein said conical sections and said intermediate portion are axially convoluted with said convolutions forming said stabilizing means.

4. A protective boot as defined in claim 1, wherein said conical sections and said intermediate portion are axially convoluted to form convolutions which include peak portions and wherein ribs are formed on said peak portions of said convolutions with said convolutions and said ribs forming said stabilizing means.

5. A protective boot as defined in claim 1, wherein said boot is of a unitary construction.

6. A boot as defined in claim 1, wherein said resilient hinge sections are of a thinner construction than said conical sections and said intermediate portion.

7. A protective boot as defined in claim 1, wherein said boot consists of a plurality of first and second conical sections and a plurality of intermediate portions, with each first and second conical section and each intermediate portion forming a segment of said boot and said segments are secured in axial alignment with one another by a third ring portion.

8. A protective boot formed of a resilient elastomeric material for a solenoid having a housing with an opening therein through which a reciprocating shaft projects with said shaft being axially movable relative to said housing through a stroke of a predetermined length from an extended position to a retracted position, said protective boot comprising:
a first ring portion sealingly fixed to said housing about said opening, and a second ring portion sealingly fixed to and reciprocatable with said shaft; a body portion forming a fluid chamber about said shaft between said first and second ring portions, said body portion comprising at least one pair of truncated conical sections each being integrally formed at their narrow portion with a respective one of said ring portions forming a first angle therebetween and an intermediate portion integrally formed between widened portions of said conical sections forming a second angle therebetween; and
means for maintaining a constant volume within said protective boot, said means comprising stabilizing means for maintaining said conical sections and said intermediate portions axially rigid during movement of said shaft between said extended position and said retracted position, and for permitting said body to be circumferentially expansible and contractable during movement of said shaft between said extended position and said retracted position;
wherein an axial extent of said fluid chamber is maintained between said first and second ring portions and said first angle and said second angle maintain substantially equal magnitudes when said reciprocatable shaft is in both its extended position and its retracted position.

9. A protective boot as defined in claim 8, wherein said conical sections and said intermediate portion are axially convoluted with said convolutions forming said stabilizing means.

10. A protective boot as defined in claim 8, wherein said conical sections and said intermediate portion are axially convoluted to form convolutions which include peak portions and wherein ribs are formed on said peak portions of said convolutions with said convolutions and said ribs forming said stabilizing means.

11. A protective boot as defined in claim 8, wherein said boot is of a unitary construction.

12. A protective boot as defined in claim 8, wherein said boot consists of a plurality of first and second conical sections and a plurality of intermediate portions, with each first and second conical section and each intermediate portion forming a segment of said boot and said segments are secured in axial alignment with one another by a third ring portion.

13. A protective boot of a unitary construction formed of a resilient elastomeric material for a solenoid having a housing with an opening therein through which a reciprocating shaft projects with said shaft being axially movable relative to said housing through a stroke of a predetermined length from an extended position to a retracted position, said protective boot comprising:

a first ring portion sealingly fixed to said housing about said opening, and a second ring portion sealingly fixed to and reciprocatable with said shaft; a body portion forming a fluid chamber about said shaft between said first and second ring portions, said body portion comprising at least one pair of truncated conical section each being integrally formed at their narrow portion with a respective one of said ring portions to form a first integral formation and an intermediate portion integrally formed between widened portions of said conical sections to form a second integral formation; and means for maintaining a constant volume within said protective boot, said means comprising stabilizing means for maintaining said conical sections and said intermediate portion axially rigid during movement of said shaft between sad extended position and said retracted position, and for permitting said body to be circumferentially expansible and contractible during movement of said shaft between said extended position and said retracted position;

wherein said first integral formation between said conical sections and said ring portions and said second integral formation between said conical sections and said intermediate portion are resilient hinge sections.

14. A boot as defined in claim 13, wherein said resilient hinge sections are of a thinner construction than said conical sections and said intermediate portion.

15. A protective boot formed of a resilient elastomeric material for a solenoid having a housing with an opening therein through which a reciprocating shaft projects with said shaft being axially movable relative to said housing through a stroke of a predetermined length form an extended position to a retracted position, said protective boot comprising:

a first ring portion sealingly fixed to said housing about said opening, and a second ring portion sealingly fixed to and reciprocatable with said shaft; a body portion forming a fluid chamber about said shaft between said first and second ring portions, said body portion comprising at least one pair of truncated conical sections each being integrally formed at their narrow portion with a respective one of said ring portions forming a first angle therebetween and an intermediate portion integrally formed between widened portions of said conical sections forming a second angle therebetween; and stabilizing means for maintaining said conical sections and said intermediate portion axially rigid during movement of said shaft between said extended position and said retracted position, and for permitting said body to be circumferentially expansible and contractible during movement of said shaft between said extended position and said retracted position wherein said stabilizing means is a plurality of circumferentially spaced axially extending ribs formed on said conical sections and said intermediate portion;

wherein an axial extent of said fluid chamber is maintained between said first and second ring portions and said first angle and said second angle maintain substantially equal magnitudes when said reciprocatable shaft is in both its extended position and its retracted position.

* * * * *